(12) United States Patent
Umemoto et al.

(10) Patent No.: US 10,852,455 B2
(45) Date of Patent: Dec. 1, 2020

(54) LAMINATE OF OPTICAL ELEMENTS HAVING A LAYER OF A PRESSURE-SENSITIVE ADHESIVE, AND A METHOD FOR PRODUCING SUCH LAMINATE OF OPTICAL ELEMENTS

(71) Applicant: NITTO DENKO CORPORATION, Ibaraki (JP)

(72) Inventors: Toru Umemoto, Fukuyama (JP); Hirofumi Katami, Mihara (JP); Hiroyuki Takao, Onomichi (JP); Takahiro Nonaka, Toyohashi (JP); Atsushi Yasui, Fuchu (JP); Takami Hikita, Fukuyama (JP)

(73) Assignee: NITTO DENKO CORPORATION, Ibaraki (JP)

( * ) Notice: Subject to any disclaimer, the term of this patent is extended or adjusted under 35 U.S.C. 154(b) by 614 days.

(21) Appl. No.: 14/891,492

(22) PCT Filed: Jan. 16, 2015

(86) PCT No.: PCT/JP2015/051130
§ 371 (c)(1),
(2) Date: Nov. 16, 2015

(87) PCT Pub. No.: WO2015/108159
PCT Pub. Date: Jul. 23, 2015

(65) Prior Publication Data
US 2016/0084991 A1    Mar. 24, 2016

(30) Foreign Application Priority Data

Jan. 17, 2014  (JP) .................................. 2014-007310
Jan. 17, 2014  (JP) .................................. 2014-007311

(51) Int. Cl.
*G02B 1/111*      (2015.01)
*B32B 7/12*       (2006.01)
(Continued)

(52) U.S. Cl.
CPC ................ *G02B 1/111* (2013.01); *B32B 7/02* (2013.01); *B32B 7/12* (2013.01); *B32B 27/06* (2013.01);
(Continued)

(58) Field of Classification Search
CPC ......... G02B 1/111; B32B 27/06; B32B 27/08; B32B 27/36; B32B 37/12; B32B 7/02;
(Continued)

(56) References Cited

U.S. PATENT DOCUMENTS 8,405,794 B2    3/2013  Fuchida et al.
10,023,766 B2 *  7/2018  Katami .................... C09J 7/385
(Continued)

FOREIGN PATENT DOCUMENTS

CN     1934463 A     3/2007
CN     102194540 A   9/2011
(Continued)

OTHER PUBLICATIONS

Chinese Office Action dated Apr. 25, 2016 corresponding to Chinese Application No. 201580000676.3 citing the above reference(s).
(Continued)

*Primary Examiner* — Eli D. Strah
(74) *Attorney, Agent, or Firm* — Hauptman Ham, LLP

(57) ABSTRACT

A laminate of optical elements comprises a transparent first optical element, a second optical element, and a transparent pressure-sensitive adhesive layer for bonding the first optical element to the second optical element. The pressure-sensitive adhesive layer comprises a base adhesive zone, a transparent refractive index-adjusting zone. The base adhe-
(Continued)

sive zone is made essentially of a transparent base pressure-sensitive adhesive material and formed over a given range from a first principal surface of the pressure-sensitive adhesive layer facing the first optical element, in a thickness direction of the pressure-sensitive adhesive layer. The a transparent, adherent, refractive index-adjusting zone is formed over a given range from a second principal surface of the pressure-sensitive adhesive layer facing the second optical element.

14 Claims, 6 Drawing Sheets

(51) Int. Cl.
| | |
|---|---|
| B32B 27/08 | (2006.01) |
| B32B 27/36 | (2006.01) |
| B32B 27/06 | (2006.01) |
| B32B 7/02 | (2019.01) |
| B32B 37/12 | (2006.01) |
| C09J 7/38 | (2018.01) |
| C09J 11/02 | (2006.01) |
| C09J 11/04 | (2006.01) |
| C09J 5/02 | (2006.01) |
| B29D 11/00 | (2006.01) |

(52) U.S. Cl.
CPC ............. *B32B 27/08* (2013.01); *B32B 27/36* (2013.01); *B32B 37/12* (2013.01); *B29D 11/0073* (2013.01); *B29D 11/00663* (2013.01); *B29D 11/00682* (2013.01); *B32B 2255/26* (2013.01); *B32B 2264/102* (2013.01); *B32B 2307/202* (2013.01); *B32B 2307/412* (2013.01); *B32B 2307/418* (2013.01); *B32B 2309/105* (2013.01); *B32B 2457/00* (2013.01); *B32B 2457/20* (2013.01); *B32B 2457/202* (2013.01); *B32B 2457/206* (2013.01); *C09J 5/02* (2013.01); *C09J 7/38* (2018.01); *C09J 11/02* (2013.01); *C09J 11/04* (2013.01); *C09J 2301/30* (2020.08); *C09J 2301/302* (2020.08); *C09J 2400/10* (2013.01); *C09K 2323/03* (2020.08); *C09K 2323/035* (2020.08); *C09K 2323/05* (2020.08); *C09K 2323/057* (2020.08)

(58) Field of Classification Search
CPC . B32B 7/12; B32B 2457/206; B32B 2457/00; B32B 2457/20; B32B 2457/202; B32B 2264/102; B32B 2309/105; B32B 2307/202; B32B 2307/412; B32B 2307/418; B32B 2255/26; C09J 5/02; C09J 11/04; C09J 11/02; C09J 2201/606; C09J 2201/60; C09J 2400/10; C09J 7/38; Y10T 428/1059; Y10T 428/105; Y10T 428/1036; Y10T 428/1077; B29D 11/0073; B29D 11/00663; B29D 11/00682

See application file for complete search history.

(56) References Cited

U.S. PATENT DOCUMENTS

| | | | |
|---|---|---|---|
| 2002/0098352 A1 | 7/2002 | Kishioka | |
| 2007/0268587 A1* | 11/2007 | Ninomiya | G02B 1/105 |
| | | | 359/601 |
| 2011/0317099 A1* | 12/2011 | Fuchida | G02B 5/0242 |
| | | | 349/64 |
| 2012/0015144 A1 | 1/2012 | Itoh et al. | |
| 2013/0134993 A1* | 5/2013 | Takao | G06F 3/044 |
| | | | 324/661 |
| 2013/0154473 A1* | 6/2013 | Kaneko | C09J 7/00 |
| | | | 313/504 |
| 2017/0361568 A1* | 12/2017 | Katami | B32B 7/02 |
| 2017/0368786 A1* | 12/2017 | Katami | B32B 7/02 |
| 2018/0134922 A1* | 5/2018 | Katami | B32B 7/02 |

FOREIGN PATENT DOCUMENTS

| | | | | |
|---|---|---|---|---|
| JP | 52-133339 A | 11/1977 | | |
| JP | 4640740 A | 2/1987 | | |
| JP | 4640740 B2 | 2/1987 | | |
| JP | 2002-212526 A | 7/2002 | | |
| JP | 2003-131032 A | 5/2003 | | |
| JP | 2003131032 A | * 5/2003 | ............. | B32B 7/02 |
| JP | 3908934 B2 | 4/2007 | | |
| JP | 5564748 B | 6/2009 | | |
| JP | 2012035559 A | 2/2012 | | |
| JP | 201252010 A | 3/2012 | | |
| JP | 2013037057 A | 2/2013 | | |
| JP | 2013114344 A | 6/2013 | | |
| JP | 2013202844 A | 10/2013 | | |
| JP | WO2015/060177 A1 | 3/2017 | | |
| KR | 10-2011-0118182 A | 10/2011 | | |
| WO | 2009133645 A1 | 11/2009 | | |
| WO | 2010073797 A1 | 7/2010 | | |
| WO | 2012029536 A1 | 3/2012 | | |

OTHER PUBLICATIONS

Korean Office Action dated Jan. 23, 2017 for Korean Application No. 10-2015-7023295, citing the above reference(s).
International Search Report for PCT/JP2015/051130 dated Mar. 31, 2015, citing the above reference(s).
Japanese Office Action dated Oct. 1, 2018 for corresponding Japanese Application No. 2017-208884, citing ihe above references.
Japanese Office Action dated May 7, 2019 for corresponding Japanese Application No. 2017-208884, citing the above reference with English translation.

\* cited by examiner (a)

Embedding resin

Adhesive (b)

Embedding resin

Nanoparticle layer

LAMINATE OF OPTICAL ELEMENTS HAVING A LAYER OF A PRESSURE-SENSITIVE ADHESIVE, AND A METHOD FOR PRODUCING SUCH LAMINATE OF OPTICAL ELEMENTS

TECHNICAL FIELD

The present invention relates to a laminate of optical elements having a layer of pressure-sensitive adhesive, and a method for producing such layer of optical elements. In particular, the present invention relates to a laminate of optical elements having a layer of a pressure-sensitive adhesive layer for bonding a transparent optical element to another optical element, and a method for producing such a laminate of optical element.

BACKGROUND ART

A display device, such as a liquid crystal display device or an organic EL display device, uses a pressure-sensitive adhesive to bond one of various types of transparent optical elements, such as a polarizing film, a retardation film, and a transparent cover member including a cover glass, to another optical element. More specifically, a pressure-sensitive adhesive layer is disposed between two optical elements to be bonded together, and then the two optical elements are pressed against each other, so that they are bonded together through the pressure-sensitive adhesive layer to thereby form a laminate of optical elements. The laminate of the optical elements configured as above may be installed such that the transparent optical element is located on a viewing side of the display device with respect to the pressure-sensitive adhesive layer and the other optical element. Such type of display device has a problem in that, when outside light enters from the transparent optical element located on the viewing side, the incident light is reflected at an interface between the pressure-sensitive adhesive layer and the other optical element located on a back side, and returned to the viewing side. This problem becomes prominent when an entry angle of outside light is relatively large.

On the other hand, in a touch panel-equipped display device which has been increasingly becoming popular in these years, a transparent electrically conductive layer, such as a patterned ITO (Indium Tin Oxide) layer, is formed on a surface of an optical element to which the first mentioned transparent optical element is bonded. It has been recognized that this type of display device further has a problem of "pattern visibility" in which the pattern of the transparent conductive layer becomes visible from the viewing side under the influence of internal reflection of the incident light at the interface between the pressure-sensitive adhesive layer and the transparent conductive layer.

In each of the cases, the internal reflection is caused by a difference in refractive index between the pressure-sensitive adhesive layer and either one of the optical elements which are bonded together by the adhesive. JP 4640740 B (Patent Document 1) teaches a technique for addressing this problem. More specifically, the Patent Document 1 discloses a pressure-sensitive adhesive composition capable of reducing total reflection of light at an interface between the transparent optical element and the pressure-sensitive adhesive layer and at the interface between the pressure-sensitive adhesive layer and the other optical element. The composition disclosed in the Patent Document 1 is allegedly described as having a refractive index which is high in its dried and/or cured state, such that the refractive index is close to refractive index of the transparent optical element and that of the other optical element. The teaching of the Patent Document 1 is that a pressure-sensitive adhesive layer for bonding two optical elements together is entirely formed to have a refractive index close to refractive indexes of the two optical elements.

The teachings of the Patent Document 1 may be effective in suppressing the interface reflection, however, there is a problem in that the composition itself becomes costly, because the teachings are based on the use of a particular monomer component.

JP 5564748 B (Patent Document 2) discloses a pressure-sensitive adhesive having a pre-adjusted refractive index and comprising particles of zirconium oxide or titanium oxide having an average dispersed particle size of 1 nm to 20 nm, the particles of zirconium oxide or titanium oxide being dispersed in a layer of a transparent pressure-sensitive adhesive throughout the thickness of the layer. It is believed that this pressure-sensitive adhesive can suppress the aforementioned interface refraction, since particles of zirconium oxide or titanium oxide having a high refractive index are mixed with the transparent pressure-sensitive adhesive material such that the overall refractive index of the layer of the adhesive is thus increased. However, the teachings of the Patent Document 2 require a use of a large amount of high refractive index material. This may cause deterioration in properties required as a pressure-sensitive adhesive, and an increase in cost. Moreover, the high refractive index material recommended in the Patent Document 2 is an inorganic material in a form of particles. Thus, another problem may be encountered in that the particles are hardly dispersed, so that whitish haze may be produced due to light scattering. In this regard, one may consider using particles of an organic material. In this case, however, it becomes difficult to solve a problem of coloration.

With a view to improving the technique disclosed in the Patent Document 2, JP 5520752 B (Patent Document 3) proposes to have metal oxide particles which are to be dispersed in a pressure-sensitive adhesive, coated with a polymer. Teaching of the Patent Document 3 is that, although the pressure-sensitive adhesive layer in the Patent Document 2 has a problem of deterioration in adherence property thereof due to the metal oxide particles exposed to a surface of the pressure-sensitive adhesive layer, this problem can be solved by coating the metal oxide particles with a polymer. The technique proposed by the Patent Document 3 would have a potential to improve the adherence property of the pressure-sensitive adhesive layer to some extent. However, it cannot solve most of the remaining problems pointed out in connection with the Patent Document 2. In particular, the technique proposed by the Patent Document 3 comprises coating the metal oxide particles with a specific polymer. Thus, the resulting pressure-sensitive adhesive becomes more costly than that in the Patent Document 2.

CITATION LIST

Patent Document

Patent Document 1: JP 4640740 B
Patent Document 2: JP 5564748 B
Patent Document 3: JP 5520752 B

SUMMARY OF INVENTION

Technical Problem to be Solved by the Invention

It is a primary object of the present invention to provide an optical element laminate capable of effectively suppressing internal reflection therein, by using a pressure-sensitive adhesive layer capable of being produced easily at low cost.

It is another object of the present invention to provide an optical element laminate comprising a pressure-sensitive adhesive layer having a refractive index-adjusting zone, thereby effectively suppressing internal reflection in the optical element laminate.

Means for Solving the Technical Problem

In brief, the present invention is directed to achieving the above object, i.e., suppressing internal reflection in an optical element laminate, by forming a refractive index-adjusting zone over a given range from a surface of a pressure-sensitive adhesive layer in a thickness direction of the pressure-sensitive adhesive layer, wherein the refractive index-adjusting zone has a refractive index greater than that of a base pressure-sensitive adhesive material of the pressure-sensitive adhesive layer.

According to a first aspect of the present invention, there is provided a laminate of optical elements which comprises a transparent first optical element, a second optical element, and a transparent pressure-sensitive adhesive layer for bonding the first optical element to the second optical element. The pressure-sensitive adhesive layer comprises: a base adhesive zone made essentially of a transparent base pressure-sensitive adhesive material and formed over a given range from a first principal surface of the pressure-sensitive adhesive layer facing the first optical element, in a thickness direction of the pressure-sensitive adhesive layer; and a transparent, adherent, refractive index-adjusting zone formed over a given range from a second principal surface of the pressure-sensitive adhesive layer facing the second optical element, in the thickness direction. The refractive index-adjusting zone has a refractive index greater than a refractive index of the base pressure-sensitive adhesive material. In the first aspect of the present invention, the refractive index of the refractive index-adjusting zone may be less than a refractive index of the second optical element.

In another aspect of the present invention, the second optical element is formed on a side facing the pressure-sensitive adhesive layer with a transparent conductive layer of a predetermined pattern. Then, the refractive index-adjusting zone is provided in contact with respective surfaces of the transparent conductive layer and the second optical element, so as to fill spaces produced between the transparent conductive layer and the second optical element due to stepped shoulders of the patterned transparent conductive layer, the refractive index-adjusting zone having a refractive index less than that of the transparent conductive layer. In this embodiment, the second optical element may be formed on a side facing the pressure-sensitive adhesive layer with a refractive index-adjusting layer having a refractive index less than the refractive index of the transparent conductive layer, wherein the refractive index of the refractive index-adjusting zone of the pressure-sensitive adhesive layer is greater than the refractive index of the refractive index-adjusting layer formed on the surface of the second optical element.

Preferably, the refractive index-adjusting zone has a thickness of 20 nm to 600 nm. The refractive index-adjusting zone may be formed by dispersing, in a pressure-sensitive adhesive material identical to the base pressure-sensitive adhesive material, particles of a high refractive index material having a refractive index greater than that of the pressure-sensitive adhesive material, to increase an average refractive index of the refractive index-adjusting zone based on the high refractive index material particles.

Preferably, in the aforementioned aspect where the second optical element comprises the transparent conductive layer of a predetermined pattern, the refractive index-adjusting zone is formed by dispersing, in a pressure-sensitive adhesive material identical to the base pressure-sensitive adhesive material, particles of a high refractive index material having a refractive index greater than that of the pressure-sensitive adhesive material, to thereby provide an average refractive index of the refractive index-adjusting zone, wherein the refractive indexes of the transparent conductive layer, the base pressure-sensitive adhesive material and the high refractive index material particles are, respectively, in the range of 1.75 to 2.14, in the range of 1.40 to 1.55 and in the range of 1.60 to 2.74. More preferably, the high refractive index material particles have an average primary particle size of 3 nm to 100 nm as measured by TEM observation. The high refractive index material may be one or more compounds selected from the group consisting of $TiO_2$, $ZrO_2$, $CeO_2$, $Al_2O_3$, $BaTiO_3$, $Nb_2O_5$ and $SnO_2$. In the above optical element laminate, a bonding interface formed between the refractive index-adjusting zone and the second optical element has a region where particles of the high refractive index material are in contact with the second optical element, and a matrix region where the pressure-sensitive adhesive material of the refractive index-adjusting zone is in contact with the second optical element. In this case, it is preferable that the region where the high refractive index material particles are in contact with the second optical element is formed in an area ratio of 30 to 99%. Preferably, a difference in refractive index between the high refractive index material particles and the base pressure-sensitive adhesive material is in the range of 0.2 to 1.3.

In one aspect of the present invention, the refractive index-adjusting zone may be formed by adding, to a pressure-sensitive adhesive material identical to the base pressure-sensitive adhesive material, an organic material having a refractive index greater than that of the pressure-sensitive adhesive material, in the form of particle, polymer or oligomer, to thereby increase an average refractive index of the refractive index-adjusting zone. When this feature is applied to the above embodiment where the second optical element comprises the transparent conductive layer, it is preferable that the refractive indexes of the transparent conductive layer, the base pressure-sensitive adhesive material and the organic material are, respectively, in the range of 1.75 to 2.14, in the range of 1.40 to 1.55 and in the range of 1.59 to 2.04. Examples of the high refractive index organic material usable herein include, but are not particularly limited to, a resin having an aromatic ring such as a styrene-based resin, and a resin containing a heteroatom such as a sulfur atom or a nitrogen atom (e.g., a polymer containing a thiol or triazine ring). Further, examples of the particles include nanometer-size organic nanoparticles and nanometer-size spherical macromolecules. Preferably, the particles have an average primary particle size of 3 nm to 100 nm as measured by TEM observation.

Preferably, in the first aspect of the present invention, the pressure-sensitive adhesive layer has a total light transmittance of 80% or more. The high refractive index material particles may partially exist in the form of an aggregate as a result of aggregation of two or more of the particles. Typically, the refractive index-adjusting zone may exist with irregular depths in the thickness direction of the pressure-sensitive adhesive layer.

According to a further aspect of the present invention, there is provided a method of suppressing internal reflection in an optical element laminate. The method comprises providing a pressure-sensitive adhesive layer for bonding a transparent first optical element to a second optical element having a transparent conductive layer of a predetermined pattern; and having the transparent pressure-sensitive adhesive layer formed at a side facing the second optical element and the transparent conductive layer with a transparent, adherent, refractive index-adjusting zone having a refractive index which is greater than that of a base pressure-sensitive adhesive material of the pressure-sensitive adhesive layer and is less than that of the transparent conductive layer; bonding the transparent, adherent, refractive index-adjusting zone to the transparent conductive layer and the second optical element, with the transparent, adherent, refractive index-adjusting zone facing the transparent conductive layer and the second optical element and the opposite surface of the pressure-sensitive adhesive layer facing the transparent first optical element; bonding the opposite surface of the pressure-sensitive adhesive layer to the first optical element, to thereby have the refractive index-adjusting zone brought into contact with both the transparent conductive layer and the second optical element, such that the refractive index-adjusting zone serves to fill spaces produced between the transparent conductive layer and the second optical element due to stepped shoulders of the patterned transparent conductive layer, to thereby have reflected light resulting from reflection of external light entering through the first optical element, at an interface between the base layer of the pressure-sensitive adhesive material and the refractive index-adjusting zone, and reflected light resulting from reflection of the external light at an interface between the refractive index-adjusting zone and the transparent conductive layer, to be at least partially cancelled out through an optical interference.

The aforementioned internal reflection suppressing method of the present invention may comprise having reflected light resulting from reflection of external light entering through the first optical element, at an interface between a zone made essentially of the base pressure-sensitive adhesive material and the refractive index-adjusting zone in the pressure-sensitive adhesive layer, and reflected light resulting from reflection of the external light at an interface between the refractive index-adjusting zone and the second optical element, to be at least partially cancelled out through an optical interference.

According to still further aspect of the present invention, there is provided a method of producing a laminate of optical elements having a transparent pressure-sensitive adhesive layer for bonding a transparent first optical element to a second optical element. The method comprises a step of forming a pressure-sensitive adhesive layer with a refractive index-adjusting zone. This step includes substeps of providing a pressure-sensitive adhesive layer made essentially of a transparent base pressure-sensitive adhesive material, providing a coating liquid containing particles of a refractive index-adjusting material having a refractive index greater than that of the base pressure-sensitive adhesive material, applying the coating liquid onto one of opposite surfaces of the pressure-sensitive adhesive layer to have the refractive index-adjusting material particles contained in the coating liquid to infiltrate from the one surface in a thickness direction of the pressure-sensitive adhesive layer, and drying the resulting pressure-sensitive adhesive layer to have liquid part of the coating liquid dissipated out of the layer. This method further comprises a step of bonding the pressure-sensitive adhesive layer with the refractive index-adjusting zone, by bonding the surface opposite to the aforementioned one surface of the pressure-sensitive layer to the first optical element, and the aforementioned one surface to the second optical element.

In the optical element laminate production method, the refractive index of the refractive index-adjusting zone may be determined to be less than that of the second optical element. Alternatively, use may be made of the second optical element provided at a side facing the pressure-sensitive adhesive layer with a transparent conductive layer of a predetermined pattern, the refractive index-adjusting zone may then be bonded to respective surfaces of the transparent conductive layer and the second optical element such that spaces formed between the transparent conductive layer and the second optical element, the refractive index of the refractive index-adjusting zone being less than that of the transparent conductive layer.

Effect of Invention

According to the present invention, the refractive index-adjusting zone having a refractive index greater than a refractive index of the base pressure-sensitive adhesive material of the pressure-sensitive adhesive layer is formed from one surface of the pressure-sensitive adhesive layer in the thickness direction of the pressure-sensitive adhesive layer, so that it becomes possible to form a high refractive index zone without causing an increase in haze value. The high refractive index zone can adjust a difference in refractive index with respect to the second optical element to thereby suppress reflection at an interface between the pressure-sensitive adhesive layer and the second optical element. In the embodiment where the second optical element is formed with the patterned transparent conductive layer, the refractive index of the refractive index-adjusting zone of the pressure-sensitive adhesive layer can be adjusted with respect to the refractive indexes of the transparent conductive layer and the second optical element, so that it becomes possible to suppress the interface reflection. In addition, the canceling-out effect based on a phase difference between respective ones of reflected light at the transparent conductive layer, reflected light at a surface of the second optical element and reflected light arising inside the pressure-sensitive adhesive layer makes it possible to significantly reduce reflected light which would otherwise be returned toward the first optical element.

BRIEF DESCRIPTION OF DRAWINGS

FIGS. 5(a) to 5(c) illustrate a process for preparing the pressure-sensitive adhesive layer in FIG. 2, wherein FIG. 5(a), FIG. 5(b) and FIG. 5(c) are schematic diagrams illustrating a dispersion liquid applying step, a high refractive index material particle infiltration-causing step and a drying step, respectively.

FIGS. 6(a) to 6(c) illustrate configurations of second optical elements prepared in Inventive Examples, wherein FIGS. 6(a), 6(b) and 6(c) illustrate ITO-formed second optical elements (1), (2) and (3), respectively.

FIGS. 7(a) to 7(c) illustrate configurations of optical element laminates of Inventive Examples, wherein FIGS. 6(a), 6(b) and 6(c) illustrate Inventive Examples 1, 2 and 3, respectively.

DESCRIPTION OF EMBODIMENTS

Figure 1:
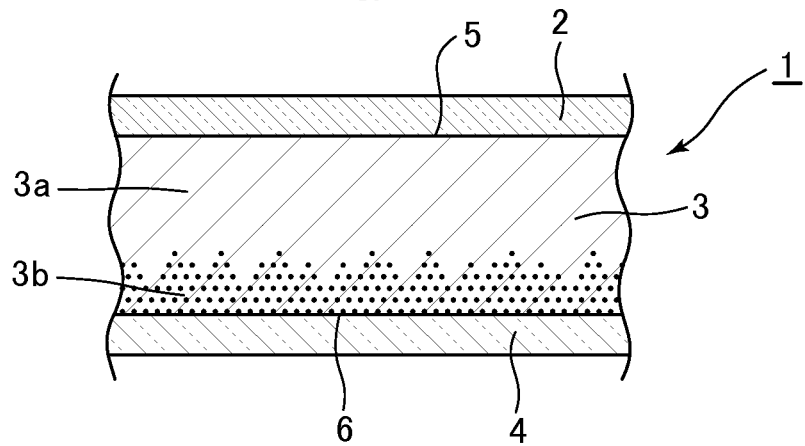
FIG. 1 is a sectional view illustrating a laminate of optical elements in accordance with one example of the simplest embodiment of the present invention.

With reference to the accompanying drawings, embodiments of the present invention will now be described. FIG. 1 is a sectional view illustrating a laminate 1 of optical elements in accordance with one example of the simplest embodiment of the present invention. The optical element laminate 1 comprises an optically transparent first optical element 2, an optically transparent pressure-sensitive adhesive layer 3, and a second optical element 4 bonded to the first optical element 2 through the pressure-sensitive adhesive layer 3. The transparent first optical element 2 may be composed of: an optical film for use in an optical display device, such as a polarizing film or a retardation film, or a transparent cover member, such as a viewing-side cover glass of an optical display device. The first optical element 2 and the second optical element 4 are bonded, respectively, to a first principal surface 5 and a second principal surface 6 of the pressure-sensitive adhesive layer 3.

In the illustrated optical element laminate 1, the transparent pressure-sensitive adhesive layer 3 comprises a base adhesive zone 3a made essentially of a base pressure-sensitive adhesive material, and a refractive index-adjusting zone 3b having a refractive index greater than that of the base adhesive zone 3a. Preferably, the base pressure-sensitive adhesive material of the base adhesive zone 3a has a refractive index close to that of the first optical element 2.

The base pressure-sensitive adhesive material is not particularly limited, as long as it is a transparent adherent material usable in optical applications. For example, it is possible to use one or more appropriately selected from the group consisting of an acrylic-based pressure-sensitive adhesive, a rubber-based-based pressure-sensitive adhesive, a silicone-based pressure-sensitive adhesive, a polyester-based pressure-sensitive adhesive, a urethane-based pressure-sensitive adhesive, an epoxy-based pressure-sensitive adhesive, and a polyether-based pressure-sensitive adhesive. From the viewpoint of transparency, processability, durability, etc., it is preferable to use an acrylic-based pressure-sensitive adhesive. As the base pressure-sensitive adhesive material, the above pressure-sensitive adhesives may be used independently or in the form of a combination of two or more of them. An acrylic-based polymer to be used as a base polymer of an acrylic-based pressure-sensitive adhesive is preferably, but not particularly limited to, a homopolymer or copolymer of monomers comprising a primary component consisting of (meth)acrylic acid alkyl ester. It should be noted that the term "(meth)acrylic" is used herein to mean either one or both of "acrylic" and "methacrylic". The same applies to the following description. In this specification, the term "acrylic-based polymer" is used to mean that it may comprise the above (meth)acrylic acid alkyl ester, and any other monomer copolymerizable with the (meth)acrylic acid alkyl ester. Generally, the refractive index of the base pressure-sensitive adhesive material is in the range of 1.40 to 1.55.

Although the thickness of the pressure-sensitive adhesive layer 3 is not particularly limited, it is set, typically, in the range of 5 μm to 500 μm, preferably, in the range of 5 μm to 400 μm, more preferably, in the range of 5 μm to 500 μm. In the pressure-sensitive adhesive layer 3, a thickness of the refractive index-adjusting zone 3b is set, preferably, in the range of 20 nm to 600 nm, more preferably, in the range of 20 nm to 300 nm, furthermore preferably, in the range of 20 nm to 200 nm. A boundary between the refractive index-adjusting zone 3b and the base adhesive zone 3a is formed as an irregular undulating curve. In this specification, the thickness of the refractive index-adjusting zone 3b is determined by averaging a plurality of measurement values of a depth of the undulation. A thickness of the base adhesive zone 3a is derived by subtracting the thickness of the refractive index-adjusting zone 3b from the thickness of the pressure-sensitive adhesive layer 3. As measured according to JIS K7361, a total light transmittance of the entire pressure-sensitive adhesive layer 3 is 80% or more, preferably, 90% or more. The higher total light transmittance of the pressure-sensitive adhesive layer 3 provides the better results.

The refractive index-adjusting zone 3b can be formed, for example, by applying a solution of a resin material having a refractive index greater than that of the base pressure-sensitive adhesive material to one of opposite surfaces of a layer made of the base pressure-sensitive adhesive material (matrix material-based pressure-sensitive adhesive layer) in a given amount, and then subjecting the resulting pressure-sensitive adhesive layer to drying. Examples of the resin material usable for this purpose include a pressure-sensitive adhesive composition described in the Patent Document 1. Alternatively, it is possible to employ a technique of: dispersing an organic material having a refractive index greater than that of the base pressure-sensitive adhesive material, such as styrene oligomer, in a dispersion medium in the form of a solid to prepare a dispersion liquid; applying the dispersion liquid to a surface of a layer made of the base pressure-sensitive adhesive material (matrix material-based pressure-sensitive adhesive layer); and subjecting the resulting pressure-sensitive adhesive layer to drying. However, in the present invention, it is preferable to employ a technique of causing particles of a high refractive index material to infiltrate from one of opposite surfaces of a layer made of the base pressure-sensitive adhesive material (matrix material-based pressure-sensitive adhesive layer), whereby the high refractive index material particles are dispersed in a region of the pressure-sensitive adhesive layer adjacent to the one surface, as described later in connection with FIG. 2.

Figure 2:
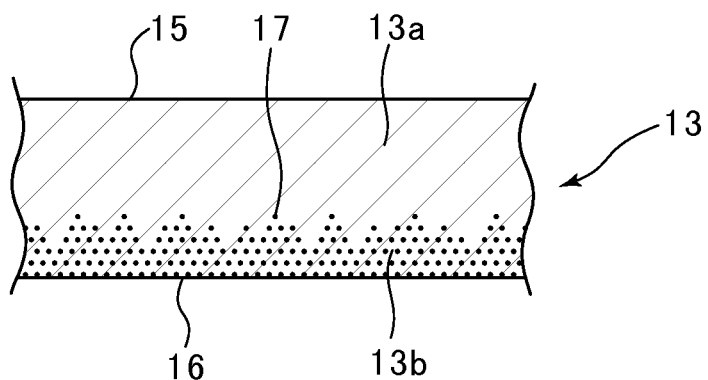
FIG. 2 is a sectional view illustrating a pressure-sensitive adhesive layer usable in a laminate of optical elements according to one embodiment of the present invention.

With reference to FIG. 2, a configuration of a pressure-sensitive adhesive layer 13 in one embodiment of the present invention will be described in detail below.

As with the pressure-sensitive adhesive layer 3 in the embodiment illustrated in FIG. 1, the pressure-sensitive adhesive layer 13 illustrated in FIG. 2 has a first principal surface 15 and a second principal surface 16, and comprises a base adhesive zone 13a made essentially of a base pressure-sensitive adhesive material, and a refractive index-adjusting zone 13b having a refractive index greater than that of the base adhesive zone 13a. Differently, in this embodiment, the refractive index-adjusting zone 13b is configured to contain particles 17 of a high refractive index material which infiltrates from the second principal surface 16 into the base pressure-sensitive adhesive material in a dispersed manner in the base pressure-sensitive adhesive material, over a given depth in a thickness direction of the pressure-sensitive adhesive layer 13, to thereby have a refractive index greater than that of the base adhesive zone 13a.

Preferably, the high refractive index material particles 17 in the refractive index-adjusting zone 13b has a refractive index in the range of 1.7 to 2.7. Preferably, the difference in refractive index between the high refractive index material particles and the base pressure-sensitive adhesive material is in the range of 0.2 to 1.3. Examples of a high refractive index material usable in this embodiment include $TiO_2$, $ZrO_2$, $CeO_2$, $Al_2O_3$, $BaTiO_3$, $Nb_2O_5$ and $SnO_2$, and one or more compounds selected from them can be used to form the high refractive index material particles 17. The high refractive index material particles 17 may be set to have an average primary particle size of 3 nm to 100 nm, and distributed in the refractive index-adjusting zone 13b in an individually dispersed state or in a partially aggregated state. As described in connection with FIG. 1, a boundary between the refractive index-adjusting zone 13b and the base adhesive zone 13a is formed as an irregular undulating curve. In a thickness measurement for the refractive index-adjusting zone 13b, a depth at each of a plurality of measurement positions in a region where 90% of the high refractive index material particles 17 exist is determined as a thickness measurement value, and the measurement values at the plurality of measurement positions are averaged to obtain a thickness of the refractive index-adjusting zone 13b.

Figure 3:
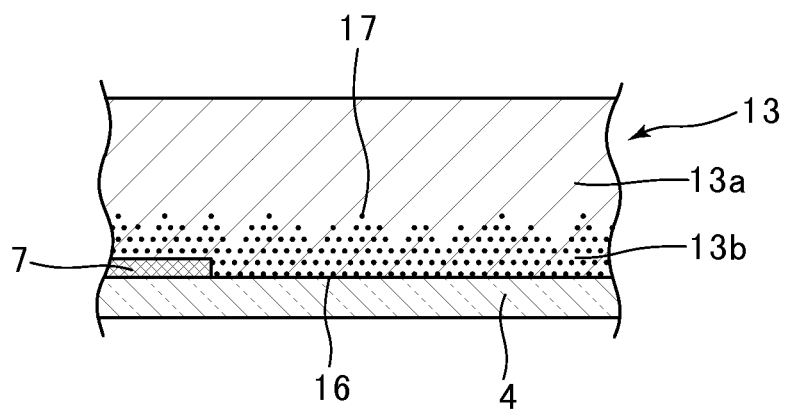
FIG. 3 is a sectional view illustrating one example in which the pressure-sensitive adhesive layer 13 in FIG. 2 is applied to a second optical element formed with a patterned transparent conductive layer.

FIG. 3 is a sectional view illustrating one example wherein a second optical element 4 is provided on one of the surfaces facing the pressure-sensitive adhesive layer 13 with a transparent conductive layer 7 such as a patterned ITO film, and the pressure-sensitive adhesive layer 13 shown in FIG. 2 is applied to the second optical element 4. In this cause, examples the second optical element 4 may include a glass substrate of a display panel, for example, in a liquid crystal display device or an organic EL display device.

Figure 4:
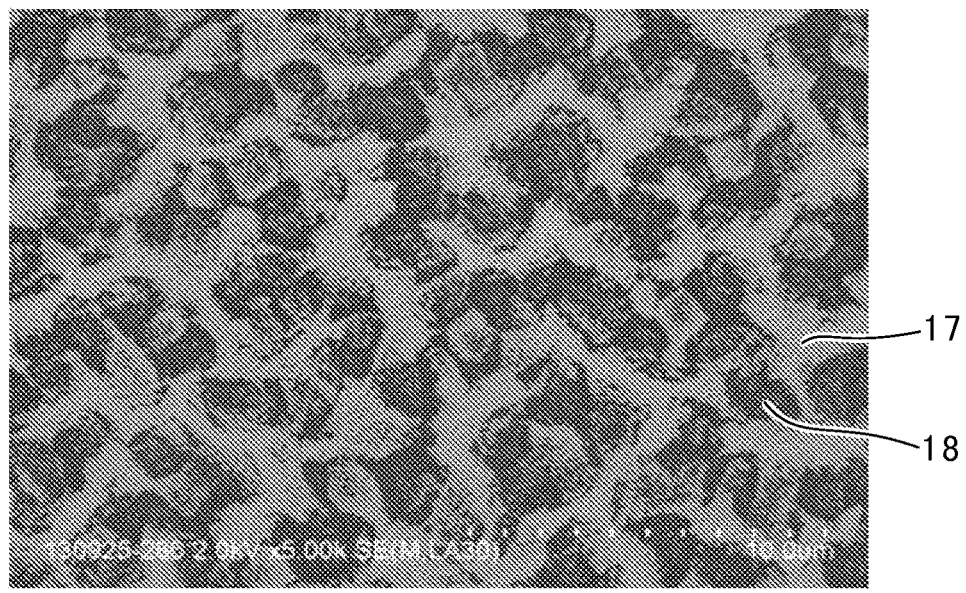
FIG. 4 is a top plan view illustrating a state of a principal surface of the pressure-sensitive adhesive layer in contact with the second optical element.

As illustrated in FIG. 3, the second principal surface 16 of the refractive index-adjusting zone 13b of the pressure-sensitive adhesive layer 13 is bonded to respective pressure-sensitive adhesive layer-side surfaces of the transparent conductive layer 7 and the second optical element 4 in such a manner as to fill up spaces formed between the transparent conductive layer 7 and the second optical element body 4 due to stepped shoulders of the patterned transparent conductive layer 7. FIG. 4 is a top plan view illustrating the principal surface 16 of the pressure-sensitive adhesive layer 13 in contact with the second optical element 4. As illustrated in FIG. 4, a microstructure of the principal surface 16 is formed in a sea-island structure where the high refractive index material particles 17 are dispersed in a matrix 18 of the base pressure-sensitive adhesive material in the form of islands. In an interface where the pressure-sensitive adhesive layer 13 is in contact with the second optical element 4, there are a region where the base pressure-sensitive adhesive material is in contact with the second optical element 4 and a region where the high refractive index material particles 17 are in contact with the second optical element 4. Preferably, the area ratio of the high refractive index material particles 17 and the base pressure-sensitive adhesive material at this position is in the range of 30 to 99%. The area ratio is calculated by measuring an area of the high refractive index material particles 17 in each of a plurality of square regions having a side length of 10 µm to 200 µm to obtain an area ratio of the high refractive index material particles 17 to the square region, and averaging the area ratios measured in the plurality of square regions.

Figure 5:
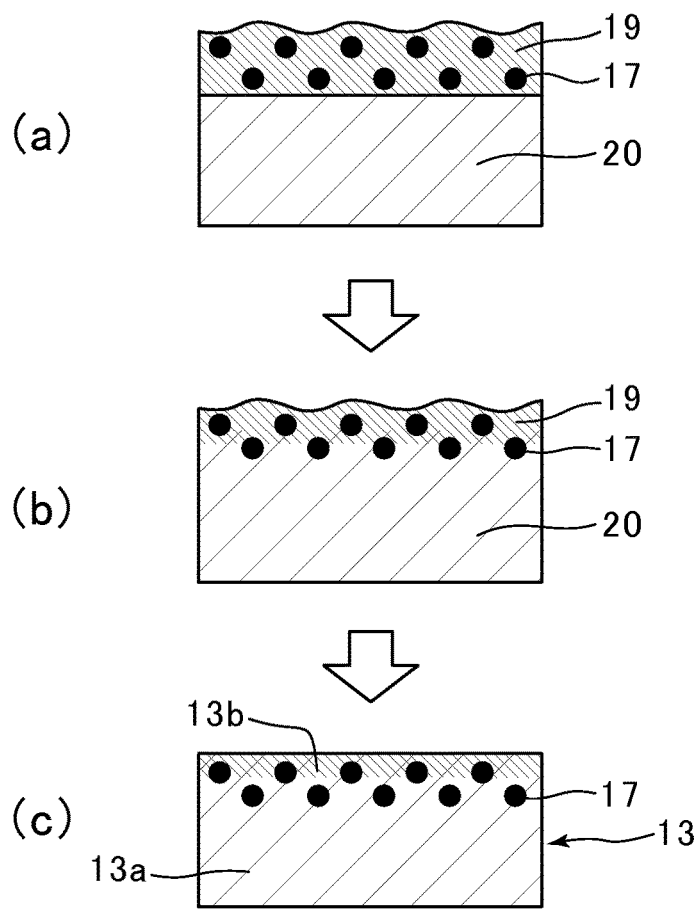

FIGS. 5(a), 5(b) and 5(c) schematically illustrate a process of producing the pressure-sensitive adhesive layer 13 in FIG. 2. First of all, a dispersion liquid 19 obtained by dispersing the high refractive index material particles 17 in a dispersion medium, and a matrix material-based pressure-sensitive adhesive layer 20, are preliminarily provided. Then, as illustrated in FIG. 5(a), the dispersion liquid 19 is applied to a surface of the matrix material-based pressure-sensitive adhesive layer 20. Thus, the surface of the matrix material-based pressure-sensitive adhesive layer 20 is swelled by the dispersion medium of the dispersion liquid 19, and, in this process, the high refractive index material particles 17 in the dispersion liquid 19 infiltrate into the matrix material-based pressure-sensitive adhesive layer 20 in the thickness direction. This state is illustrated in FIG. 5(b). Subsequently, the resulting pressure-sensitive adhesive layer 20 is dried to vaporize the dispersion medium of the dispersion liquid 19 to obtain the pressure-sensitive adhesive layer 13 illustrated in FIG. 2. This state is illustrated in FIG. 5(c).

An infiltration depth of the high refractive index material particles 17 with respect to the matrix material-based pressure-sensitive adhesive layer 20 is determined by a relationship between the base pressure-sensitive adhesive material and the dispersion medium of the dispersion liquid 19. The dispersion medium may be appropriately selected to allow the infiltration depth to become the aforementioned value.

EXAMPLES

The present invention will be further described below, based on examples.

[Preparation of Base Pressure-Sensitive Adhesive Materials]
<Preparation of Base Pressure-Sensitive Adhesive Material A>
(Acrylic Oligomer)

60 weight parts of dicyclopentanyl methacrylate (DCPMA), 40 weight parts of methyl methacrylate (MMA), 3.5 weight parts of α-thioglycerol as a chain transfer agent, and 100 weight parts of toluene as a polymerization medium were put into a four-neck flask, and stirred in a nitrogen atmosphere at 70° C. for 1 hour. Then, 0.2 weight parts of 2,2'-zobisisobutyronitrile as a polymerization initiator was put into the four-neck flask to cause a reaction at 70° C. for 2 hours, followed by a further reaction at 80° C. for 2 hours. Then, the resulting reaction solution was placed in an atmosphere at 130° C. to remove the toluene, the chain transfer agent and unreacted monomers therefrom by drying to thereby obtain an acrylic-based polymer in a solid form. The acrylic-based polymer obtained in this manner was named as "acrylic-based polymer (A-1)". A weight-average molecular weight (Mw) of the acrylic-based polymer was $5.1 \times 10^3$.

(Base Pressure-Sensitive Adhesive Material A)

0.035 weight parts of a photopolymerization initiator (trade name: "IRGACURE 184", produced by BASF SE.) and 0.035 weight parts of a photopolymerization initiator (trade name "IRGACURE 651" produced by BASF SE.) were added to a monomer mixture of 68 weight parts of acrylic acid 2-ethylhexyl (2EHA), 14.5 weight parts of N-vinyl-2-pyrrolidone (NVP) and 17.5 weight parts of acrylic acid 2-hydroxyethyl (HEA), and then the resulting mixture was irradiated with ultraviolet light until a viscosity thereof reached about 20 Pa·s (measurement conditions: BH viscometer, No. 5 rotor, 10 rpm, 30° C. (measurement temperature)) to obtain a prepolymer composition in which the above monomers were partially polymerized.

Then, 5 weight parts of the acrylic-based polymer (A-1), 0.15 weight parts of hexanediol diacrylate (HDDA) and 0.3 weight parts of a silane coupling agent (trade name: "KBM-403", produced by Shin-Etsu Chemical Co., Ltd.) were added to and mixed with the above prepolymer composition to obtain an acrylic-based pressure-sensitive adhesive composition. The acryl-based pressure-sensitive adhesive composition was applied onto a release surface of a releasable film (trade name: "MRF #38", produced by Mitsubishi Plastics, Inc.) to form a pressure-sensitive adhesive composition layer of 150 μm thick to provide a layer of pressure-sensitive adhesive composition, and then a releasable film (trade name: "MRF #38", produced by Mitsubishi Plastics, Inc.) was attached onto the surface of the pressure-sensitive adhesive composition layer. Subsequently, the pressure-sensitive adhesive composition layer was irradiated with ultraviolet light under the condition that: illuminance: 5 mW/cm$^2$; and light intensity: 1,500 mJ/cm$^2$) to form a pressure-sensitive adhesive layer.

<Preparation of Base Pressure-Sensitive Adhesive Material B>

32 weight parts of 2-ethylhexyl acrylate (2EHA), 48 weight parts of isostearyl acrylate (ISTA), 20 weight parts of 2-hydroxypropyl acrylate (2HPA), and two types of photopolymerization initiators: 0.05 weight parts of a photopolymerization initiator (trade name: "IRGACURE 184", produced by BASF SE.) and 0.05 weight parts of a photopolymerization initiator (trade name: "IRGACURE 651", produced by BASF) were put into a four-neck flask to prepare a monomer mixture. Subsequently, this monomer mixture was subjected to exposure of ultraviolet light in a nitrogen atmosphere in such a manner as to be partially photo-polymerized, thereby obtaining a partially polymerized product (acrylic-based polymer syrup) having a polymerization rate of about 10 weight %. 0.02 weight parts of trimethylolpropane triacrylate (TMPTA) and 0.3 weight parts of a silane coupling agent (trade name: "KBM-403", produced by Shin-Etsu Chemical Co., Ltd.) were added to 100 weight parts of the above acrylic-based polymer syrup, and uniformly mixed together to prepare a monomer component.

Subsequently, a 38 μm-thick polyester film (trade name: "DIAFOIL MRF", produced by Mitsubishi Plastics, Inc.) having one surface subjected to a release treatment using silicone was provided, and the monomer component prepared in the above manner was applied onto the release-treated surface of the polyester film to form a coating layer thereon in such a manner as to allow an ultimate thickness thereof to become 100 μm. Then, a 38 μm-thick polyester film (trade name: "DIAFOIL MRF", produced by Mitsubishi Plastics, Inc.) having one surface subjected to a release treatment using silicone was provided, and attached to cover a surface of the applied monomer component in such a manner that the release-treated surface of polyester film faces the coating layer. In this way, the coating layer of the monomer component was blocked from oxygen. The resulting sheet with the coating layer was irradiated with ultraviolet light having an illuminance of 5 mW/cm$^2$ (as measured by Topcon UVR-TI having a peak sensitivity at about 350 nm) by using a chemical light lamp (produced by TOSHIBA Corp.), for 360 seconds, to thereby harden the coating layer to form a pressure-sensitive adhesive layer, so that a pressure-sensitive adhesive sheet (substrate-less type, thickness of the pressure-sensitive adhesive layer is 100 nm) provided with the releasable sheets on respective opposite surfaces of the pressure-sensitive adhesive layer was prepared.

<Preparation of Base Pressure-Sensitive Adhesive Material C>

A monomer component comprising 99 parts of butylacrylate (BA) and 1 part of 4-hydroxybutylacrylate (4HBA), a polymerization initiator comprising 0.2 parts of azobisisobutylonitrile serving as and ethyl acetate serving as a polymerization medium were put in such amounts that a solid content would become 30% into a separable flask equipped with a thermometer, a stirring device, a reflux cooling tube and a nitrogen introducing tube. Then, the mixture was subjected to nitrogen substitution for about 1 hour under stirring by supplying nitrogen gas to pass through the mixture. Subsequently, the flask was heated to 60° C. to induce a reaction for 7 hours to obtain an acrylic-based polymer having a weight-average molecular weight (Mw) of 1,100,000. 0.1 parts of trimethylolpropane-xylylene diisocyanate ("Takenate D110N" produced by Mitsui Chemicals, Inc.) serving as an isocyanate-based cross-linking agent, and 0.1 parts of a silane coupling agent ("KBM-403" produced by Shin-Etsu Chemical Co., Ltd.) were added to the above acrylic-based polymer (solid content: 100 parts) to prepare a pressure-sensitive adhesive composition (solution). The pressure-sensitive adhesive solution prepared in the above manner was applied to a release-treated surface of a releasable sheet in such a manner as to allow a thickness thereof to become 25 μm after being dried. Then, the resulting coating layer was dried under normal pressures at 60° C. for 1 minute and further at 150° C. for 1 minute, and the dried coating layer was subjected to aging at 23° C. for 120 hours to produce a pressure-sensitive adhesive layer.

[Preparation of Pressure-Sensitive Adhesive with a Refractive Index-Adjusting Layer]

<Case of Using the Base Pressure-Sensitive Adhesive Material A and a Dispersion Liquid for the High Refractive Index Material Nanoparticles>

(Case of Using Base Pressure-Sensitive Adhesive Material A and a Dispersion Liquid (Dispersion Medium: Ethanol) for the Nanoparticles)

A layer of the base pressure-sensitive adhesive material A (refractive index: 1.49) of 150 μm-thick was provided with two low release force-type PET releasable sheets for protecting respective opposite surfaces thereof, and one of the low release force-type PET releasable sheets was then peeled off. A coating treatment liquid (dispersion medium: ethanol, particle concentration: 1.5 weight %, infiltration index of dispersion liquid: 75%; produced by CIK Nanotech Co., Ltd.) containing zirconia particles ($ZrO_2$, refractive index: 2.17, average primary particle size: 20 nm) and serving as a dispersion liquid containing high refractive index particles was applied to the exposed surface of the pressure-sensitive adhesive layer by using a bar coater RDS No. 5 in such a manner as to form a refractive index-adjusting zone having a thickness of 20 nm to 300 nm, and dried in a drying oven at 110° C. for 180 seconds. Then, a PET releasable sheet was attached onto the exposed surface of the resulting pressure-sensitive adhesive layer on which the zirconia ($ZrO_2$) particles were dispersed, thereby obtaining a pressure-sensitive adhesive sheet. The average primary particle size of the zirconia particles was measured by TEM observation.

<Other Cases>

Using the following base pressure-sensitive adhesive materials and high refractive index material nanoparticle dispersion liquids, various pressure-sensitive adhesive sheets were prepared in the same manner as that in the above case. Employed materials were the base pressure-sensitive adhesive material B (refractive index: 1.48), the base pressure-sensitive adhesive material C (refractive index: 1.47), the $ZrO_2$ nanoparticle dispersion liquid (dispersion medium: ethanol, particle size: 20 nm), a $ZrO_2$ nanoparticle dispersion liquid (dispersion medium: ethanol, particle size: 30 nm), and a $ZrO_2$ nanoparticle dispersion liquid (dispersion medium: n-propanol, particle size: 20 nm).

<Case of Using Base Pressure-Sensitive Adhesive Material A & Solution of Styrene Oligomer as High Refractive Index Material>

One of the low release force-type PET releasable sheets protecting the respective opposite surfaces of the pressure-sensitive adhesive layer made of the base pressure-sensitive adhesive material A (refractive index: 1.49) and formed to have a thickness of 150 μm was peeled off. Then, a styrene oligomer solution (refractive index: 1.60; "SX-100" produced by Yasuhara Chemical Co., Ltd.) containing styrene oligomer preliminarily dispersed in toluene in such a manner as to a solid content concentration thereof to become 2 weight % was applied to an exposed surface by using a bar coater RDS No. 5 in such a manner as to form a refractive index-adjusting zone having a thickness of 20 nm to 300 nm, and dried in a drying oven at 110° C. for 180 seconds. Then, a PET releasable sheet was attached onto the exposed surface of the resulting pressure-sensitive adhesive layer containing styrene, thereby obtaining a pressure-sensitive adhesive sheet.

[Evaluation Method]

<Observation of Surface State of Pressure-Sensitive Adhesive Layer>

Figure 8:
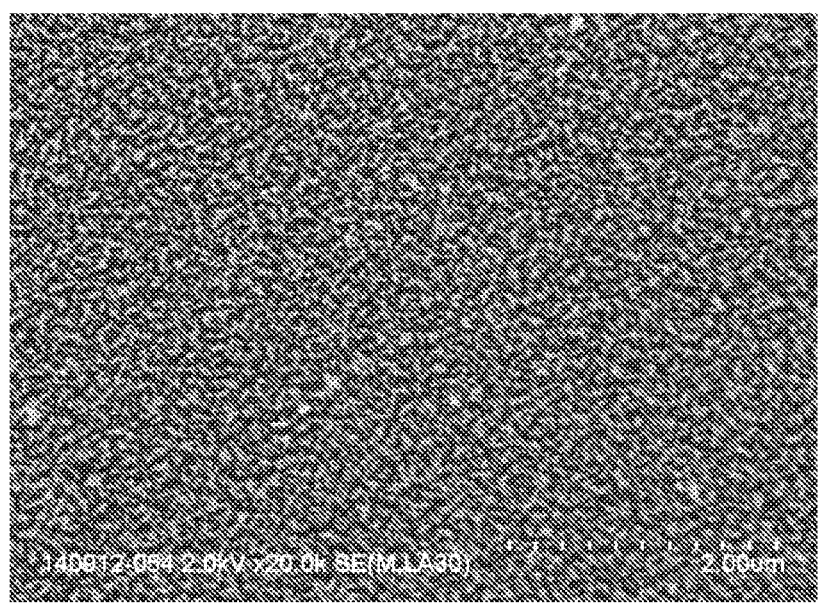
FIG. 8 is a 20000×SEM photograph presenting a surface state of a refractive index-adjusting zone of a pressure-sensitive adhesive layer prepared in one Inventive Example.

In each Inventive Example, the surface of the pressure-sensitive adhesive layer having the high refractive index material particles was observed using a field emission scanning electron microscope (FE-SEM) at an acceleration voltage of 2 kV, and at respective magnifications: 500 times, 2,000 times, 5,000 times and 20,000 times. A SEM photograph at a magnification of 20,000 times is presented in FIG. 8. The SEM photograph shows that the high refractive index material particles are uniformly dispersed.

<Observation of Gradation Structure>

Figure 9:
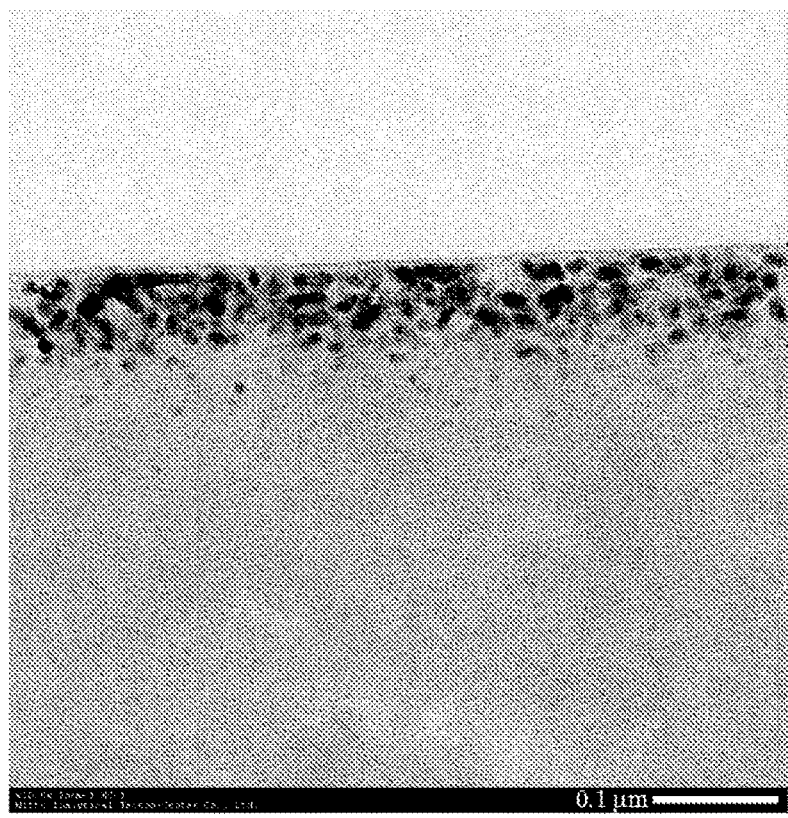
FIGS. 9(a) and 9(b) are 30000×TEM cross-sectional photographs each presenting a high refractive index material particle distribution in a refractive index-adjusting zone of a pressure-sensitive adhesive layer in a respective one of two different Inventive Examples.
Figure 9:
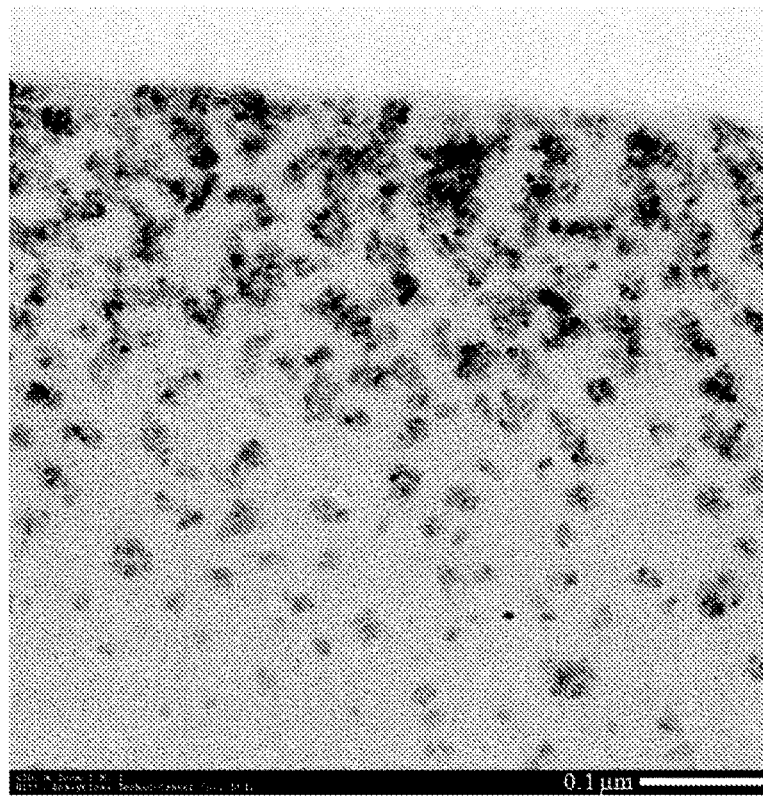

In two Inventive Examples, a cross-section adjacent to the surface of the pressure-sensitive adhesive layer having the high refractive index material particles was observed using a transmission electron microscope (TEM) at a magnification of 30,000 times. Results of the observation are presented in FIGS. 9(*a*) and 9(*b*). FIG. 9(*a*) shows that the high refractive index material particles are approximately uniformly distributed over approximately the entire thickness of the refractive index-adjusting zone, whereas FIG. 9(*b*) shows that a distribution density of the high refractive index material particles in the pressure-sensitive adhesive layer is maximized at one surface of the pressure-sensitive adhesive layer, and gradually reduced toward the other surface in a thickness direction of the pressure-sensitive adhesive layer.

<Average Surface Refractive Index>

An average surface refractive index of the pressure-sensitive adhesive sheets Obtained in Inventive and Comparative Examples was calculated by measuring refractive indexes in the sodium D-lines (589 nm) using a spectroscopic ellipsometer ("EC-400" produced by JA. Woolam Co.). In each of the pressure-sensitive adhesive sheets of Inventive and Comparative Examples, the releasable sheets on the opposite surfaces of the pressure-sensitive adhesive layer were peeled off, and a black plate was laminated to the surface where the particles were not applied. In this state, an average surface refractive index was measured at the side where the particles were applied. On the other hand, in each of the pressure-sensitive adhesive sheets of Comparative Examples, two releasable sheets on respective opposite surfaces of the pressure-sensitive adhesive layer were peeled off, and then a black plate was laminated to one of the surfaces. In this state, an average surface refractive index of the other surface of the pressure-sensitive adhesive layer was measured.

<Measurement of Thickness of Refractive Index-Adjusting Zone>

A cross-section of the pressure-sensitive adhesive layer in a depth direction was adjusted to perform TEM observation. Based on the resulting TEM image (direct magnification: 3,000 to 30,000 times), a thickness of the refractive index-adjusting zone was measured. The thickness of the refractive index-adjusting zone was determined as an average value of undulation of the interface between the base adhesive zone and the refractive index-adjusting zone. In a situation where it was difficult to identify the interface between the base adhesive zone and the refractive index-adjusting zone, an interfacial TEM image was subjected to binary image processing using image processing software (ImageJ), and a depth in a region where 90% of the nanoparticles exists was determined as the thickness of the refractive index-adjusting zone.

<Area Ratio of High Refractive Index Material Particles>

The particle infiltration-side surface of the pressure-sensitive adhesive layer was observed using FE-SEM at an acceleration voltage of 2 kV, and at respective magnifications: 500 times, 2,000 times and 5,000 times. The resulting interfacial TEM image was subjected to binary image processing using image processing software (ImageJ) to measure an area of the high refractive index material particles in a rectangular region having a long side length of 23 μm and a short side length of 18 μm so as to calculate an area ratio (%) of the high refractive index material particles to the entire rectangular region.

<Total Light Transmittance & Haze Value>

In each of the pressure-sensitive adhesive sheets obtained in Inventive Examples, the releasable sheet was peeled off at the side where the particles were applied, and in each of the Comparative Examples, the releasable sheet was peeled off at one of the surfaces. Then, a glass slide (trade name: "ShiroKenma (White Polish) No. 1", produced by Matsunami Glass Ind., Ltd., thickness: 0.8 to 1.0 mm, total light transmittance: 92%, haze: 0.2%) was attached to the exposed surface. Then, the other releasable sheet was further peeled off to prepare a test piece having a two-layer structure of the pressure-sensitive adhesive layer and the glass slide. On the other hand, in each of the pressure-sensitive adhesive sheets obtained in Comparative Examples, one of the releasable sheets was peeled off, and a glass slide (trade name: "ShiroKenma No. 1", produced by Matsunami Glass Ind., Ltd., thickness: 0.8 to 1.0 mm, total light transmittance: 92%, haze: 0.2%) was attached to the exposed surface. Then, the other releasable sheet was further peeled off to prepare a test piece having a two-layer structure of the pressure-sensitive adhesive layer and the glass slide. For each of the test pieces, a total light transmittance and a haze value in a visual light range was measured using a haze meter (device name: HM-150, produced by Murakami Color Research Laboratory Co., Ltd).

<Adhesive Force During 180-Degree Peeling (Adhesive Force with Respect to Glass Plate During 180-Degree Peeling)>

A sheet piece having a length of 100 mm and a width of 20 mm was cut from each of the sheets obtained in Inventive and Comparative Examples. Then, in each of the sheet pieces of Inventive Examples, the releasable sheets was peeled off at the surface where the particles were not applied, and in each of the sheet pieces of Comparative Examples, the releasable sheets was peeled off at one of the opposite surfaces. Then, a PET film (trade name: "LUMIRROR S-10", produced by TORAY Industries Inc., thickness: 25 µm) was attached (lined) to the exposed surface. On the other hand, in each of the sheet pieces of Comparative Examples 1 and 2, one of the releasable sheets was peeled off, and a PET film (trade name: "LUMIRROR S-10", produced by TORAY Industries Inc., thickness: 25 µm) was attached (lined) to the exposed surface. Then, the other releasable sheet was peeled off, and then the sheet piece was press-bonded to a glass plate (trade name: "Soda-Lime Glass #0050", produced by Matsunami Glass Ind., Ltd.) as a test plate, under press-bonding conditions: 2 kg roller; and one stroke, to prepare a sample having a three-layer structure of the test plate, the pressure-sensitive layer and the PET film.

Each of the obtained samples was subjected to an autoclave treatment (50° C., 0.5 MPa, 15 minutes), and then subjected to cooling in an atmosphere at 23° C. and 50% R.H. for 30 minutes. After the cooling, the pressure-sensitive adhesive sheet was peeled off from the test plate to measure an adhesive force (N/20 mm) during 180-degree peeling, using a tension tester (device name: Autograph, produced by Shimadzu Corp.) according to JIS Z0237, in an atmosphere at 23° C. and 50% R.H., under conditions: tension rate=300 mm/minute; and peeling angle=180-degree. Further, in each of Inventive and Comparative Examples, a pressure-sensitive adhesive sheet was prepared without application of the particles of high refractive index, and an adhesive force (of the pressure-sensitive adhesive layer) during 180-degree peeling was measured in the same manner as above. Then, a ratio (%) of the adhesive force during 180-degree peeling in each of the samples to the adhesive force of the matrix material-based pressure-sensitive adhesive layer was calculated.

<Infiltration Index of High Refractive Index Particle-Containing Dispersion Liquid>

An infiltration index of the high refractive index particle-containing dispersion liquid was measured by a photoelectrometer (AC-114 produced by Optima Inc.) using a 530 nm filter. On the assumption that an infiltration index of the dispersion medium itself is 100%, an infiltration index (%) of each of the dispersion liquids used in Inventive and Comparative Examples was calculated.

<Measurement of Reflection Suppression Ratio>

One of the opposite surfaces of each of the optical element laminates in Inventive and Comparative Examples was defined as a reflectance measuring surface, and a black PET substrate-attached tape (PET75NBPET38 produced by Lintec Corp.) was attached to the other surface to prepare a reflectance measuring sample. A reflectance (Y value) of each of the optical element laminates on the side of the reflectance measuring surface was measured by a reflection spectrophotometer (U4100, produced by Hitachi High-Technologies Corp.). The measurement was performed at respective positions corresponding to an etched area and a non-etched area of the transparent conductive layer. Thus, the value of measurement at the etched area (opening) of the transparent conductive layer represents a reflectance at an interface between the refractive index-adjusting zone of the pressure-sensitive adhesive layer and a refractive index-adjusting layer of the laminate of the optical elements, and the value of the measurement at the non-etched area (patterned portion) of the transparent conductive layer represents a reflectance at an interface between the refractive index-adjusting zone of the pressure-sensitive adhesive layer and the transparent conductive layer.

For each of the etched area and the non-etched area, a reflection suppression ratio was calculated based on the following formula. In the following formula, "reflectance (%) in case devoid of the particles" means a reflectance of each of the optical element laminates in Comparative Examples (using no particle). That is, the reflection suppression ratio is an index indicating how much a reflectance can be reduced by providing the refractive index-adjusting zone.

Reflection suppression ratio (%)=reflectance (%)−reflectance (%) in case devoid of the particles

[Preparation of Laminate Composed of Refractive Index-Adjusted Pressure-Sensitive Adhesive Layer and Transparent Conductive Layer]

<Preparation of Transparent Conductive Layer Using ZEONOA (COP) as Substrate>

A coating liquid prepared by adding 0.07 parts of a plurality of 3 µm-diameter particles (trade name: "SSX105", produced by Sekisui Jushi Corp.) to 100 parts of binder resin (trade mark "UNIDIC RS29-120", produced by DIC Corp.) was applied to each of opposite surfaces of a 100 µm-thick cycloolefin polymer film (trade name: "ZEONOA ZF16", produced by Nippon Zeon Co., Ltd., in-plane birefringence: 0.0001) by using a bar coater, and dried in an oven at 80° C. for 1 minute. Then, the resulting film was irradiated with ultraviolet light (high-pressure mercury vapor lamp) in an integrated amount of 300 mJ, to form a cycloolefin polymer film having anti-blocking layers on respective opposite surfaces thereof (this film will hereinafter be referred to as "COP substrate"). Then, a refractive index adjuster (trade name: "OPSTAR KZ6661", produced by JSR Corp.) was applied to one surface of the COP substrate by using a bar coater, and dried in an oven at 80° C. for 1 minute. Then, the resulting COP substrate was irradiated with ultraviolet light (high-pressure mercury vapor lamp) in an integrated amount of 300 mJ, so that a 100 nm-thick refractive index-adjusting layer having a refractive index of 1.65 was formed on the one surface of the COP substrate. Then, a 23 nm-thick indium tin oxide (ITO) layer serving as a transparent conductive layer is formed on a surface of the refractive index-adjusting layer of the COP substrate by using a winding type sputtering apparatus.

<Preparation of Transparent Conductive Layer Using PET as Substrate>

A coating liquid prepared by adding 0.1 parts of a plurality of 3 µm-diameter particles (trade name: "SSX105", produced by Sekisui Jushi Corp.) to 100 parts of binder resin (trade mark "UNIDIC RS29-120", produced by DIC Corp.) was applied to one of opposite surfaces of a 50 µm-thick PET film (trade name: "LUMIRROR: U40", produced by TORAY Industries Inc.) by using a bar coater, and dried in an oven at 80° C. for 1 minute. Then, the resulting film was irradiated with ultraviolet light (high-pressure mercury vapor lamp) in an integrated amount of 300 mJ, to form a 1.5 µm-thick anti-blocking layer on the one surface of the PET film. Further, a coating liquid prepared by adjusting a solid content of a hard coat-forming resin (trade name: "OPSTAR KZ7540 (containing silica nanoparticles)", produced by JSR Corp.) to 10% using MIBK was applied to the other surface the PET film by using a bar coater, and dried in an oven at 80° C. for 1 minute. Then, the resulting film was irradiated with ultraviolet light (high-pressure mercury vapor lamp) in an integrated amount of 300 mJ, to form a PET film having a 1.5 μm-thick hard coat layer on the one surface thereof (this film will hereinafter be referred to as "PET substrate").

Subsequently, a coating liquid prepared by adjusting a solid content of a refractive index adjuster (trade name: "OPSTAR H0001 (containing zirconia nanoparticles)", produced by JSR Corp.) to 10% using MIBK was applied onto the hard coat layer by using a bar coater, and dried in an oven at 80° C. for 1 minute. Then, the resulting PET substrate was irradiated with ultraviolet light (high-pressure mercury vapor lamp) in an integrated amount of 300 mJ, so that a 35 nm-thick refractive index-adjusting layer 2 having a refractive index of 1.63 was formed on a surface of the PET substrate. Then, a coating liquid prepared by adjusting a solid content of a refractive index adjuster (trade name: "L-005 (containing hollow silica nanoparticles)", produced by JSR Corp.) to 1.5% using MIBK was applied onto the refractive index-adjusting layer 2 by using a bar coater, and dried in an oven at 80° C. for 1 minute. Then, the resulting PET substrate was irradiated with ultraviolet light (high-pressure mercury vapor lamp) in an integrated amount of 300 mJ, so that a 40 nm-thick refractive index-adjusting layer 1 having a refractive index of 1.49 was formed on a surface of the refractive index-adjusting layer 2. Subsequently, the PET substrate provided with the refractive index-adjusting layers 1, 2 was put into a winding type sputtering apparatus to form a 23 nm-thick indium tin oxide (ITO) layer serving as a transparent conductive layer on a surface of the refractive index-adjusting layer 1.

<Preparation of Transparent Conductive Layer Using Glass as Substrate>

An ITO film was formed on one surface of alkali-free glass (refractive index: 1.53) by sputtering, to prepare a transparent conductive substrate having a non-crystallized ITO film (refractive index: 1.85). A content rate of Sn in this ITO film was 3 weight %. The content rate of Sn in the ITO film was calculated from the following formula: weight of Sn atoms/(weight of Sn atoms+weight of In atoms).

<Production of Optical Element Laminate Functioning as Touch Panel Sensor>

After a photoresist film is formed on a portion of the transparent conductive layer, the resulting laminate was immersed in an aqueous solution containing 5 weight % of hydrochloric acid (aqueous solution of hydrogen chloride) and having a temperature of 25° C., for 1 minute, so as to subject the transparent conductive layer to etching. Through the etching, a non-etched area (patterned portion) corresponding to an electrode wiring pattern, and an etchingly removed area (opening), are formed in the transparent conductive layer. The PET releasable sheet attached to the surface having the high reflective index material particles was peeled off, and the resulting pressure-sensitive adhesive sheet was laminated on the patterned transparent conductive layer in such a manner that the pressure-sensitive adhesive layer on the adhesive sheet (the surface having the high reflective index material particles thereon) comes into contact with the patterned transparent conductive layer. Then, after the other PET releasable sheets of the pressure-sensitive adhesive sheet were peeled off, a glass slide or a 100 μm-thick cycloolefin polymer film (trade name: "ZEONOA ZF16", produced by Nippon Zeon Co., Ltd., in-plane birefringence: 0.0001) for surface protection and optical measurement was laminated to the exposed surface.

[Preparation of Second Optical Element]

Figure 6:
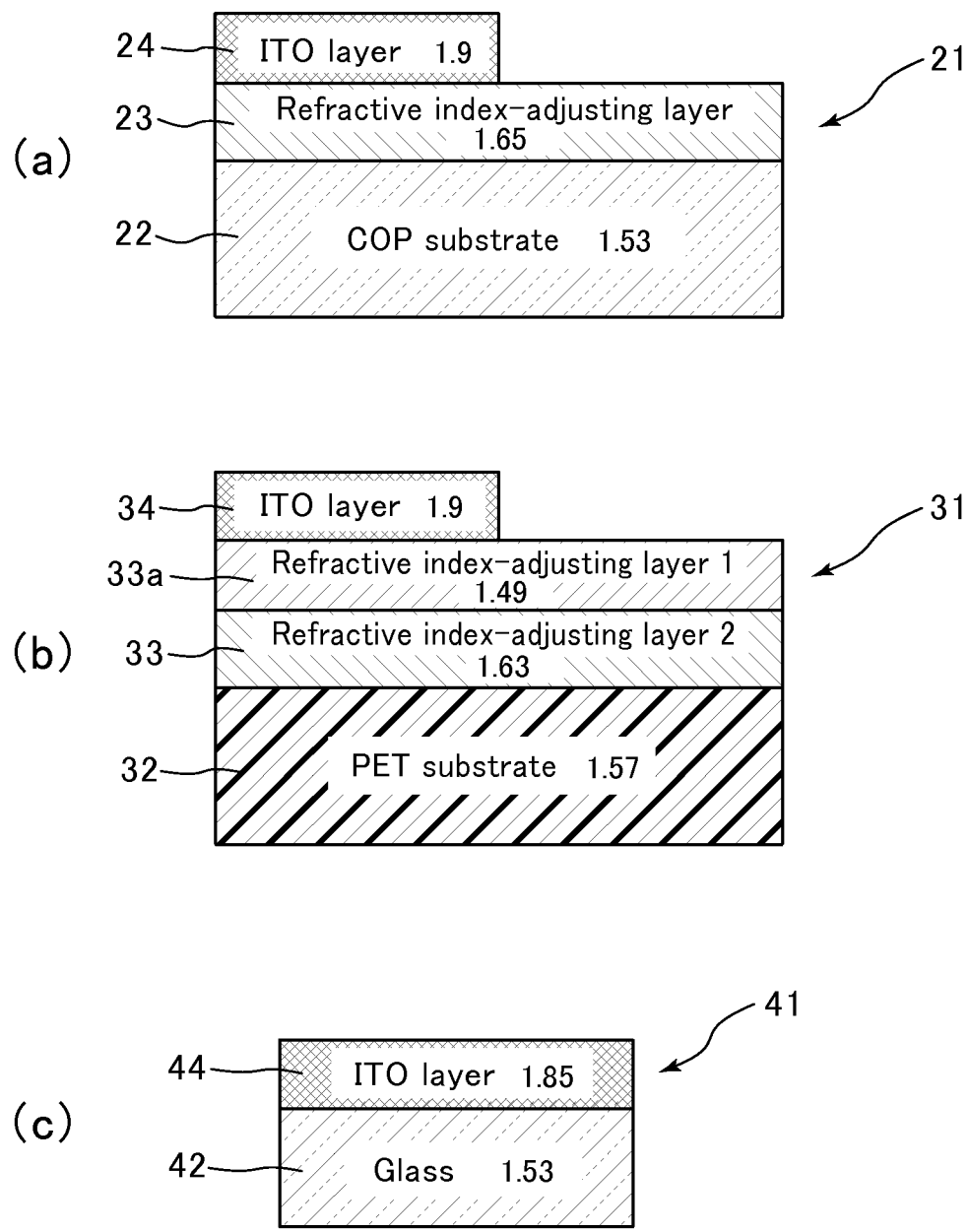

As the second optical element 4, a sub-laminate 21 illustrated in FIG. 6(a) and a sub-laminate 31 illustrated in FIG. 6(b) were employed. The sub-laminate 21 illustrated in FIG. 6(a) comprises: a COP substrate 22 having a refractive index 1.53; a refractive index-adjusting layer 23 formed on one surface of the COP substrate 22 to have a refractive index of 1.05; and a patterned ITO layer 24 formed on the refractive index-adjusting layer 23. The ITO layer has a refractive index of 1.9. This sub-laminate 21 will hereinafter be referred to as "ITO-formed second optical element (1)".

The sub-laminate 31 illustrated in FIG. 6(b) comprises: a PET substrate 32 having a refractive index 1.57; a refractive index-adjusting layer 33 formed on one surface of the PET substrate 32 to have a refractive index of 1.63; a refractive index-adjusting layer 33a formed on the refractive index-adjusting layer 33 to have a refractive index of 1.49, and a patterned ITO layer 34 formed on the refractive index-adjusting layer 33a. In this case, the ITO layer also has a refractive index of 1.9. This sub-laminate 31 will hereinafter be referred to as "ITO-formed second optical element (2)".

Further, a sub-laminate 41, called "ITO-formed second optical element (3)", illustrated in FIG. 6(c) was employed. This sub-laminate 41 as the ITO-formed second optical element (3) comprises: a glass substrate 42 having a refractive index 1.53; and a non-patterned ITO layer 44 formed on the glass substrate 42.

Inventive Example 1

Figure 7:
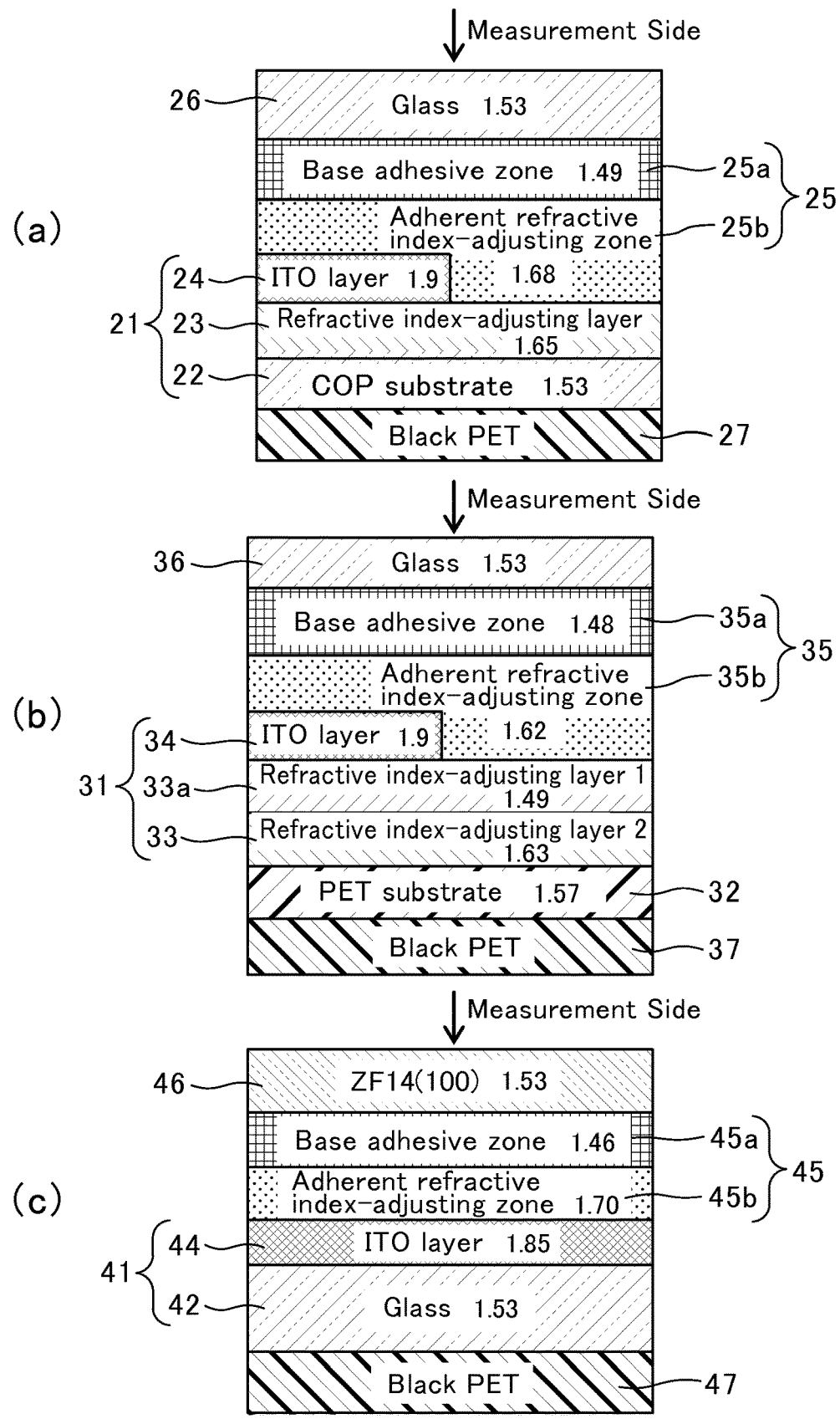

As illustrated in FIG. 7(a), the ITO-formed second optical element (1) was bonded to a glass window 26 constituting the first optical element 2 of the present invention through a pressure-sensitive adhesive layer 25 in accordance with one embodiment of the present invention. The glass window 26 had a refractive index of 1.53. The pressure-sensitive adhesive layer 25 comprised of a base adhesive zone 25a made of the base pressure-sensitive adhesive material A having a refractive index of 1.49, and a refractive index-adjusting zone 25b having a refractive index of 1.68. The refractive index-adjusting zone 25b was formed by dispersing zirconium oxide particles having an average particle size of 20 nm in ethanol solution to prepare a dispersion liquid containing 1.5 weight % of zirconium oxide particles, applying the dispersion liquid to a surface of a pressure-sensitive adhesive layer made of the base pressure-sensitive adhesive material A to cause the zirconium oxide particles to infiltrate from the surface in a thickness direction of the pressure-sensitive adhesive layer, and drying the resulting pressure-sensitive adhesive layer. The pressure-sensitive adhesive layer 25 had a thickness of 150 μm, and the refractive index-adjusting zone 25b had a thickness of 150 nm. Two photographs of a surface and a cross-section of the refractive index-adjusting zone 25b in Inventive Example 1 are presented, respectively, in FIG. 8 and FIG. 9(a). For reflectance measurement, a black PET film 27 was attached to the other surface (back surface) of the COP substrate 22 on a side opposite to the refractive index-adjusting layer 23. The resulting optical element laminate was subjected to measurement of optical properties. A result of the measurement is presented in the following Table 1.

Inventive Example 2

As illustrated in FIG. 7(b), the ITO-formed second optical element (2) was bonded to a glass window 36 constituting the first optical element 2 of the present invention through a pressure-sensitive adhesive layer 35 in accordance with another embodiment of the present invention. The glass window 36 had a refractive index of 1.53. The pressure-sensitive adhesive layer 35 had a base adhesive zone 35a made of the base pressure-sensitive adhesive material B having a refractive index of 1.48, and a refractive index-adjusting zone 35b having a refractive index of 1.62. The refractive index-adjusting zone 35b was formed by: dispersing zirconium oxide particles having an average particle size of 20 nm in n-propanol solution to prepare a dispersion liquid containing 2.0 weight % of zirconium oxide particles; applying the dispersion liquid to a surface of a pressure-sensitive adhesive layer made of the base pressure-sensitive adhesive material B to cause the zirconium oxide particles to infiltrate from the surface in a thickness direction of the pressure-sensitive adhesive layer; and drying the resulting pressure-sensitive adhesive layer. The pressure-sensitive adhesive layer 35 had a thickness of 100 µm, and the refractive index-adjusting zone 35b had a thickness of 500 nm. A photograph of a cross-section of the refractive index-adjusting zone 35b in Inventive Example 2 is presented in FIG. 9(b). For reflectance measurement, a black PET film 37 was attached to the other surface (back surface) of the PET substrate 32 on a side opposite to the refractive index-adjusting layer 33. The resulting optical element laminate was subjected to measurement of optical properties. A result of the measurement is presented in the Table 1.

Inventive Example 3

As illustrated in FIG. 7(c), the ITO-formed second optical element (3) was bonded to a glass window 46 serving as the first optical element 2 through a pressure-sensitive adhesive layer 45. The glass window 46 is a transparent member formed of ZENOR film (ZF-100, trade name) and having a refractive index of 1.53. The pressure-sensitive adhesive layer 45 had a base adhesive zone 45a made of the base pressure-sensitive adhesive material C and having a refractive index of 1.46; and a refractive index-adjusting zone 45b having a refractive index of 1.70. The refractive index-adjusting zone 45b was formed by: dispersing zirconium oxide particles having an average particle size of 30 nm in ethanol solution to prepare a dispersion liquid containing 1.5 weight % of zirconium oxide particles; applying the dispersion liquid to a surface of a pressure-sensitive adhesive layer made of the base pressure-sensitive adhesive material C to cause the zirconium oxide particles to infiltrate from the surface in a thickness direction of the pressure-sensitive adhesive layer; and drying the resulting pressure-sensitive adhesive layer. The pressure-sensitive adhesive layer 45 had a thickness of 25 µm, and the refractive index-adjusting zone 45b had a thickness of 200 nm. For reflectance measurement, a black PET film 47 was attached to the other surface (back surface) of the glass substrate 42 on a side opposite to the ITO layer 44. The resulting optical element laminate was subjected to measurement of optical properties. A result of the measurement is presented in the following Table 1.

Inventive Example 4

Using a pressure-sensitive adhesive layer configured differently from that in Inventive Example 1, an optical element laminate having the same structure as that illustrated in FIG. 7(a) was prepared. In Inventive Example 4, the ITO-formed second optical element (1) was bonded to a glass window 26 serving as the first optical element 2 through the above pressure-sensitive adhesive layer 25. The glass window 26 had a refractive index of 1.53. The pressure-sensitive adhesive layer 25 had a base adhesive zone 25a made of the base pressure-sensitive adhesive material A and having a refractive index of 1.49; and a refractive index-adjusting zone 25b having a refractive index of 1.65. The refractive index-adjusting zone 25b was formed by: dispersing titanium oxide particles having an average particle size of 20 nm in n-butanol solution to prepare a dispersion liquid containing 0.5 weight % of titanium oxide particles; applying the dispersion liquid to a surface of a pressure-sensitive adhesive layer made of the base pressure-sensitive adhesive material A to cause the titanium oxide particles to infiltrate from the surface in a thicknesswise direction of the pressure-sensitive adhesive layer; and drying the resulting pressure-sensitive adhesive layer. In Inventive Example 4, the pressure-sensitive adhesive layer 25 had a thickness of 150 µm, and the refractive index-adjusting zone 25b had a thickness of 130 nm. For reflectance measurement, a black PET film 27 was attached to the other surface (back surface) of the COP substrate 22 on a side opposite to the refractive index-adjusting layer 23. The resulting optical element laminate was subjected to measurement of optical properties. A result of the measurement is presented in the following Table 1.

Inventive Example 5

An optical element laminate having the same structure as that illustrated in FIG. 7(a) was prepared by forming an aftermentioned refractive index-adjusting zone using styrene oligomer having a reflective index of 1.60. In Inventive Example 5, the ITO-formed second optical element (1) was bonded to a glass window 26 serving as the first optical element 2 through a pressure-sensitive adhesive layer 25. The glass window 26 had a refractive index of 1.53. The pressure-sensitive adhesive layer 25 had a base adhesive zone 25a made of the base pressure-sensitive adhesive material A and having a refractive index of 1.49; and a refractive index-adjusting zone 25b having a refractive index of 1.55. The refractive index-adjusting zone 25b was formed by: dispersing styrene oligomer serving as a solid component and having a refractive index of 1.60 in toluene solution to prepare a dispersion liquid having a solid content of 2 weight %; applying the dispersion liquid to a surface of a pressure-sensitive adhesive layer made of the base pressure-sensitive adhesive material A to cause the solid component to infiltrate from the surface in a thickness direction of the pressure-sensitive adhesive layer; and drying the resulting pressure-sensitive adhesive layer. In Inventive Example 5, the pressure-sensitive adhesive layer 25 had a thickness of 150 µm, and the refractive index-adjusting zone 25b had a thickness of 300 nm. For reflectance measurement, a black PET film 27 was attached to the other surface (back surface) of the COP substrate 22 on a side opposite to the refractive index-adjusting layer 23. The resulting optical element laminate was subjected to measurement of optical properties. A result of the measurement is presented in the following Table 1.

Comparative Example 1

The ITO-formed second optical element (1) was bonded to a glass window 26 serving as the first optical element 2 and having a refractive index of 1.53, through a pressure-sensitive adhesive layer consisting only of the base pressure-sensitive adhesive material A, to prepare an optical element laminate in Comparative Example 1.

Comparative Example 2

The ITO-formed second optical element (2) was bonded to a glass window 26 serving as the first optical element 2 and having a refractive index of 1.53, through a pressure-sensitive adhesive layer consisting only of the base pressure-sensitive adhesive material B, to prepare an optical element laminate in Comparative Example 2.

Comparative Example 3

The ITO-formed second optical element (3) was bonded to a glass window 26 serving as the first optical element 2 and having a refractive index of 1.53, through a pressure-sensitive adhesive layer consisting only of the base pressure-sensitive adhesive material C, to prepare an optical element laminate in Comparative Example 3.

TABLE 1

| | Conditions for preparation | | | Properties of obtained adhesive composition Measurement for adhesive layer itself | |
|---|---|---|---|---|---|
| | Adhesive Type | Thickness (μm) | High refractive index mareial | Average interfacial refractive index | Thickness of refractive index adjusting zone ($n_D$) |
| Inventive Example 1 | A | 150 | Application of ethanol dispersion liquid containing zirconium oxide (average particle size: 20 nm) (solid content: 1.5 wt %, dispersion liquid infiltration index: 82%) | 1.68 | 150 nm |
| Inventive Example 2 | B | 100 | Application of n-propanol dispersion liquid containing zirconium oxide (average particle size: 20 nm) (solid content: 2.0 wt %, dispersion liquid infiltration index: 76%) | 1.62 | 500 nm |
| Inventive Example 3 | C | 25 | Application of ethanol dispersion liquid containing zirconium oxide (average particle size: 30 nm) (solid content: 1.5 wt %, dispersion liquid infiltration rate:) | 1.70 | 200 nm |
| Inventive Example 4 | A | 150 | Application of n-butanol dispersion liquid containing titanium oxide (average particle size: 20 nm) (solid content: 0.5 wt %, dispersion liquid infiltration index: 75%) | 1.65 | 130 nm |
| Inventive Example 5 | A | 150 | Application of toluene solution containing organic material (styrene oligomer, refractive index: 1.60) (solid content: 2 wt %) | 1.56 | 200 nm |
| Comparative Example 1 | A | 150 | None | 1.49 | — |
| Comparative Example 2 | B | 100 | None | 1.48 | — |
| Comparative Example 3 | C | 25 | None | 1.46 | — |

| | Properties of obtained adhesive composition Measurement for adhesive layer itself | | | Verrification of internal reflection Reflectance improving effect | |
|---|---|---|---|---|---|
| | Total light transmittance | Adhesive force of surface of refractive index-adjusting zone [N/20 mm] | Haze value | ITO area (improving effect) | Substrate area (improving effect) |
| Inventive Example 1 | 92.3 | 12 | 0.6 | 5.0% (−0.6%) | 4.9% (−0.6%) |
| Inventive Example 2 | 92.4 | 15 | 0.5 | 4.9% (−0.3%) | 4.8% (−0.3%) |
| Inventive Example 3 | 91.8 | 2 | 0.8 | 5.9% (−0.5%) | — |
| Inventive Example 4 | 92.0 | 13 | 0.9 | 5.1% (−0.5%) | 5.0% (−0.5%) |
| Inventive Example 5 | 92.1 | 12 | 0.6 | 5.3% (−0.3%) | 5.2% (−0.3%) |
| Comparative Example 1 | 92.3 | 15 | 0.5 | 5.6 | 5.6 |
| Comparative Example 2 | 92.3 | 20 | 0.5 | 5.2 | 5.1 |
| Comparative Example 3 | 92.2 | 3 | 0.5 | 6.4 | — |

INDUSTRIAL APPLICABILITY

As mentioned above, in the present invention, in the transparent pressure-sensitive adhesive layer for bonding the first optical element to the second optical element, the refractive index-adjusting zone having a refractive index greater than a refractive index of the base pressure-sensitive adhesive material is formed over a given range from a surface of the pressure-sensitive adhesive layer on the side of the second optical element, in the thickness direction of the pressure-sensitive adhesive layer, so that it becomes possible to suppress the situation where internal reflections of external light are returned through the first optical element. The present invention can be applied to an optical display device, such as a liquid crystal display device and an organic EL display device. In particular, the present invention can be advantageously applied to a touch panel type display device having a touch sensor.

LIST OF REFERENCE SIGNS

1: optical element laminate
2: first optical element
3, 13: transparent pressure-sensitive adhesive layer
3a, 13a: base adhesive zone
3b, 13b: refractive index-adjusting zone
4: second optical element
7: transparent conductive layer
17: high refractive index material particles
19: dispersion liquid
20: pressure-sensitive adhesive layer
21, 31: sub-laminate
22: COP substrate
23: refractive index-adjusting layer
24: ITO layer
25: pressure-sensitive adhesive layer
26: glass window

The invention claimed is:

1. A laminate of optical elements comprising a transparent first optical element, a second optical element, and a transparent pressure-sensitive adhesive layer for bonding the first optical element to the second optical element, wherein the pressure-sensitive adhesive layer comprises:
  a base adhesive zone comprising a transparent base pressure-sensitive adhesive material and formed over a given range from a first principal surface of the pressure-sensitive adhesive layer facing the first optical element, in a thickness direction of the pressure-sensitive adhesive layer; and
  a transparent, adherent, refractive index-adjusting zone formed over a given range from a second principal surface of the pressure-sensitive adhesive layer facing the second optical element, in the thickness direction, the refractive index-adjusting zone having a refractive index greater than a refractive index of the base pressure-sensitive adhesive material,
  wherein
    a boundary between the base adhesive zone and the refractive index-adjusting zone is an undulating curve having irregular depths in the thickness direction of the pressure-sensitive adhesive layer with respect to at least one of the first principal surface or the second principal surface,
    the refractive index-adjusting zone comprises a pressure-sensitive adhesive material identical to the base pressure-sensitive adhesive material and particles having a refractive index greater than that of the pressure-sensitive adhesive material that increase an average refractive index of the refractive index-adjusting zone,
    the pressure-sensitive adhesive layer comprising the base adhesive zone and the refractive index-adjusting zone is a continuous layer of pressure-sensitive adhesive material,
    the particles included in the refractive index adjusting zone are distributed within the continuous layer of pressure-sensitive adhesive material such that at least 90% of the particles establish a pattern defining the boundary between the base adhesive zone and the refractive index-adjusting zone, and internal to the continuous layer of pressure-sensitive adhesive material,
    the particles are formed of one or more compounds selected from the group consisting of $TiO_2$, $ZrO_2$, $CeO_2$, $Al_2O_3$, $BaTiO_3$, $Nb_2O_5$ and $SnO_2$,
    the second optical element is formed at a side facing the pressure-sensitive adhesive layer with a transparent conductive layer of a predetermined pattern,
    the refractive index-adjusting zone is in contact with both the transparent conductive layer and the second optical element, so as to fill spaces formed between the transparent conductive layer and the second optical element due to stepped shoulders of the pattern of the transparent conductive layer, and
    the refractive index of the refractive index-adjusting zone is less than that of the transparent conductive layer.

2. The optical element laminate as recited in claim 1, wherein the refractive index of the refractive index-adjusting zone is less than that of the second optical element.

3. The optical element laminate as recited in claim 1, wherein the refractive index of the refractive index-adjusting zone is greater than that of an area of said second optical element other than said transparent conductive layer.

4. The optical element laminate recited in claim 1, wherein the second optical element is formed with a refractive index-adjusting layer having a refractive index less than that of the transparent conductive layer.

5. The optical element laminate recited in claim 4, said refractive index of the refractive index-adjusting zone is higher than that of the said refractive index adjusting layer formed on the surface of said second optical element.

6. The optical element laminate as recited in claim 1, wherein the refractive index-adjusting zone has a thickness of 20 nm to 600 nm.

7. The optical element laminate as recited in claim 1, wherein the refractive indexes of the transparent conductive layer, the base pressure-sensitive adhesive material and the particles are, respectively, in the range of 1.75 to 2.14, in the range of 1.40 to 1.55 and in the range of 1.60 to 2.74.

8. The optical element laminate as recited in claim 1, wherein a bonding interface formed between the refractive index-adjusting zone and the second optical element has a region where the particles are in contact with the second optical element, and a matrix region where the pressure-sensitive adhesive material of the refractive index-adjusting zone is in contact with the second optical element.

9. The optical element laminate as recited in claim 1, wherein the particles have an average primary particle size of 3 nm to 100 nm as measured by TEM observation.

10. The optical element laminate as recited in claim 1, wherein a difference in refractive index between the particles and the base pressure-sensitive adhesive material is in the range of 0.2 to 1.3.

11. The optical element laminate as recited in claim 1, wherein the particles comprise an organic material having a refractive index greater than that of the pressure-sensitive adhesive material.

12. The optical element laminated recited in claim 1, wherein the particles comprise an organic material, and wherein the refractive indexes of the transparent conductive layer, the base pressure-sensitive adhesive material and the organic material are, respectively, in the range of 1.75 to 2.14, in the range of 1.40 to 1.55 and in the range of 1.59 to 2.04.

13. The optical element laminate as recited in claim 1, wherein the pressure-sensitive adhesive layer has a total light transmittance of 80% or more.

14. The optical element laminate as recited in claim 1, wherein the particles partially exist in the form of an aggregate as a result of aggregation of two or more of the particles.

* * * * *